United States Patent [19]

Tanaka

[11] Patent Number: 4,566,070
[45] Date of Patent: Jan. 21, 1986

[54] METHOD OF COUNTING PARTS

[75] Inventor: Kunifusa Tanaka, Kyoto, Japan

[73] Assignee: Kabushiki Kaisha Ishida Koki Seisakusho, Kyoto, Japan

[21] Appl. No.: 415,751

[22] Filed: Sep. 7, 1982

[30] Foreign Application Priority Data

Sep. 7, 1981 [JP] Japan .................. 56-141346
Sep. 7, 1981 [JP] Japan .................. 56-141347
Sep. 7, 1981 [JP] Japan .................. 56-141348

[51] Int. Cl.⁴ ............... G01G 19/04; G01G 19/42
[52] U.S. Cl. ........................... 364/567; 177/1; 177/25
[58] Field of Search ............... 364/567, 568, 479, 550; 177/25, 1

[56] References Cited

U.S. PATENT DOCUMENTS

| | | | |
|---|---|---|---|
| 3,716,706 | 2/1973 | Gray .................. | 364/567 |
| 3,789,202 | 1/1974 | Yamanaka .................. | 364/567 |
| 3,862,666 | 1/1975 | Muskat et al. .................. | 177/50 |
| 3,939,332 | 2/1976 | Williams, Jr. et al. .............. | 364/567 |
| 4,043,412 | 8/1977 | Rock .................. | 364/567 X |
| 4,139,069 | 2/1979 | Domis et al. .................. | 364/567 X |
| 4,139,070 | 2/1979 | Hanson et al. .................. | 364/567 X |
| 4,157,738 | 6/1979 | Nishiguchi et al. .................. | 177/1 |
| 4,219,089 | 8/1980 | Gard et al. .................. | 364/567 |
| 4,360,070 | 11/1982 | Hirano .................. | 177/25 |
| 4,375,243 | 3/1983 | Doll .................. | 364/567 X |
| 4,375,838 | 3/1983 | Yano et al. .................. | 364/567 X |
| 4,416,341 | 11/1983 | Hirano .................. | 364/567 X |
| 4,447,885 | 5/1984 | Biss .................. | 364/567 X |

FOREIGN PATENT DOCUMENTS

| | | |
|---|---|---|
| 0142419 | 11/1981 | Japan . |
| 2067862 | 3/1981 | United Kingdom . |
| 2070362 | 3/1981 | United Kingdom . |
| 1591079 | 10/1981 | United Kingdom . |

Primary Examiner—Edward J. Wise
Attorney, Agent, or Firm—Staas & Halsey

[57] ABSTRACT

A method of counting articles includes weighing a multiplicity of articles in n weighing hoppers, and dividing the weight of the articles weighed by each of the weighing hoppers by a preset unit weight to determine the number of articles in each of the weighing hoppers. Combinations of the numbers of the articles are computed, and the one of the combinations which has the number of combined articles equal or closest to a set number is found. Then, a new unit weight is derived from the weight of the articles contained in one or more weighing hoppers and the number of articles contained in the same one or more weighing hoppers, and the preset unit weight is renewed by the derived new unit weight. The method also includes the step of renewing the preset unit weight with the new unit weight only when the new unit weight falls within a preset unit weight range, each time a prescribed number of counting operations are carried out or after a prescribed length of time. Therefore, the renewal of the unit weight does not need to be effected in each counting operation.

33 Claims, 16 Drawing Figures

METHOD OF COUNTING PARTS

BACKGROUND OF THE INVENTION

The present invention relates to a method of counting articles, and more particularly to a method of counting articles by finding the total weight of articles contained in a plurality of weighing hoppers, dividing the total weight by the unit weight of the article to determine the number of articles in each weighing hopper, selecting a combination of those weighing hoppers containing a number of articles which is equal to or closest to a target number within a preset allowable range, and discharging the articles from the selected weighing hoppers.

It is generally quite cumbersome to count small articles such as bolts, nuts and the like. Counting such articles one by one is tedious and time-consuming as they normally need to be counted in a large quantity. There has been used an article counting apparatus for weighing a multiplicity of articles to determine their total weight and dividing the total weight by the unit weight of the article to find the number of the articles. Such an article counting apparatus operates by measuring the total weight of a number of articles contained in each of a plurality of weighing hoppers, dividing the weight by the unit weight of the article to find the number of articles in each weighing hopper, selecting a combination of those weighing hoppers which contain a total number of articles that is closest to a target number of articles within a preset allowable range, and discharging the articles from the selected weighing hoppers. Thereafter, the weighing hoppers from which the articles have been removed are replenished with new articles to be weighed so as to be ready for an operation to find a next combination of weighing hoppers. The foregoing process is then repeated for continued automatic counting of articles. FIG. 1 illustrates the general construction of such an article counting apparatus. The article counting apparatus has a dispersing table 11 of the vibratory conveyance type for vibratably dispersing articles radially outwardly when the dispersing table 11 is vibrated for a predetermined interval of time. The articles thus radially outwardly dispersed are supplied into a plurality of n radial weighing stations 1, 1, ... disposed around the dispersing table 11. Each weighing station 1 includes a dispersing feeder 1a, a pool hopper 1b, a pool hopper gate 1c, a weighing hopper 1d, a weight sensor 1e, a weighing hopper gate 1f, and a hopper driver unit 1g.

As shown in FIG. 2, the dispersing feeder 1a is composed of a feeder base 1a-1 and a trough 1a-2 mounted on the feeder base 1a-1 with an electromagnetic feeder 1a-3 and a leaf spring 1a-4 interposed therebetween. A multiplicity of such feeder bases 1a-1 are arranged radially outwardly around the outer circumference of the dispersing table 11 and mounted by coil springs 1a-5 on a circular support base 1h positioned above a frame of the article counting apparatus. When articles are supplied onto the dispersing table 11 which is imparted with spiral reciprocable motion by an electromagnetic vibratory unit, the articles are discharged radially outwardly off a conical surface of the dispersing table 11 under such spiral reciprocable motion and supplied into the troughs 1a-2. The articles thus supplied into the troughs 1a-2 are then conveyed in the direction of the arrow (FIG. 2) in the troughs 1a-2 upon rectilinear reciprocable movement of the electromagnetic feeder 1a-3, and fall off the distal end of the troughs into the respective pool hoppers 1b. In FIG. 1, the pool hopper gate 1c is provided on each pool hopper 1b in such a manner that the articles received in the pool hopper 1b are released into the weighing hopper 1d when the pool hopper gate 1c is opened under the control of the corresponding hopper driver unit 1g. Each weight sensor 1e, accompanying a respective one of the weighing hoppers 1d, is operable to measure the weight of the articles introduced into the corresponding weighing hopper, and to apply an electrical signal indicative of the measured weight to a combination control unit (not shown). The combination control unit serves to divide the weight of articles contained in each of the weighing hoppers by the unit weight of the article to determine the number of articles in each weighing hopper, and then serves to select an optimum combination of those weighing hoppers which contain a total number of articles that is closest to a target number.

Each weighing hopper 1d is provided with its own weighing hopper gate 1f. Only the weighing hopper gates 1f of the weighing hoppers in the optimum combination are opened under the control of the hopper driver unit 1g to discharge the articles into a common chute 1j wherein they are collected together. The collecting chute 1j has the shape of a funnel and is so arranged as to receive the articles from any of the circularly arrayed weighing hoppers via the hopper gages, which are located above the funnel substantially along its outer rim. The articles received by the collecting chute 1j are collected at the centrally located lower end thereof by falling under their own weight or by being forcibly shifted along the inclined wall of the funnel by a mechanical scraper or the like (not shown).

In operation, articles are charged into each of the pool hoppers 1b and weighing hoppers 1d. The weight sensors 1e associated with the weighing hoppers 1d measure the weights of the articles and supply the combination control unit (not shown) with signals indicative of the measured weight values, denoted $L_1$ through $L_{10}$. The combination control unit computes the numbers of articles contained respectively in the weighing hoppers based on the weight values $L_1$ through $L_{10}$, and selects an optimum combination of those weighing hoppers which contain a total number of articles that is closest to a target number within a preset allowable range. The hopper driver units 1g respond by opening the prescribed weighing hopper gates 1f based on the optimum combination, whereby the articles giving the optimum combination are released into the collecting chute 1j from the corresponding weighing hoppers 1d. This will leave the selected weighing hoppers 1d empty. Subsequently, therefore, the pool hopper gates 1c corresponding to the empty weighing hoppers 1d are opened to introduce a fresh supply of articles from the respective pool hoppers 1b into the weighing hoppers 1d, leaving these pool hoppers 1b empty. Accordingly, the dispersing feeders 1a which correspond to the empty pool hoppers 1b are vibrated for a predetermined period of time to deliver a fresh supply of articles to these empty pool hoppers 1b. This restores the weighing apparatus to the initial state to permit resumption of the control operation for selecting the optimum weight combinations in the manner described. Thus, counting by the article counting apparatus may proceed in continuous fashion by repeating the foregoing steps.

The articles to be counted by the article counting apparatus are such that not all of the articles have equal unit weights, but the actual unit weights of the articles may differ slightly from a reference unit weight. When there is a difference between the preset unit weight and the actual unit weight of the article, the computed number of articles contained in each weighing hopper is subjected to an error, with the result that the number of combined articles which has been computed by adding the articles in the selected weighing hoppers is also subjected to an error. Accordingly, the articles cannot always be counted accurately. Another problem is that the greater the number of articles to be counted by a single weighing machine, the greater the error the computed number of articles has. Correct computation of the number of a multiplity of articles, therefore, requires that the unit weights of the articles be determined correctly. Since articles vary in weight, however, it is meaningless to find unit weights by weighing individual articles correctly. It is better practice to weigh a multiplicity of articles and divide their total weight by the number of the articles to determine average unit weight. The greater the number of articles to be weighed, the more correctly the unit weight can be obtained.

The assignee of the subject application has proposed an article counting apparatus wherein unit weights are automatically variable as disclosed in Japanese Patent Application No. 55-133908. According to this proposal, the article counting apparatus operates by weighing a multiplicity of articles with n weighing machines, dividing the total weight measured by each weighing machine by the unit weight of the article to find the number of articles contained in each of the weighing machines, then computing various combinations of articles to determine the numbers of articles thus combined, and finding one of the combinations which has the number of articles equal or closest to a preset number. The article counting apparatus then computes a new unit weight based on the total weight of articles contained in a single or a plurality of weighing machines and the total number of articles contained in said single or plurality of weighing machines, and relies on the new unit weight in a next counting operation for computing the number of articles.

Where articles such as bolts, nuts or the like are to be counted which have only slightly different actual unit weights, there are instances in which it is better not to renew the unit weight determined in each article counting operation. More specifically, where article unit weights vary only slightly and are subject to a gradual change, no large unit weight difference results when the unit weight is renewed each time the articles are counted. Therefore, the computation process is rendered useless.

When the unit weight suffers from a large difference for some reasons and it is renewed into a new unit weight which differs widely from the previous one, there is a tendency for a next counting operation to fail to count the articles correctly, or for the unit weights of the discharged articles to differ eventually.

SUMMARY OF THE INVENTION

Accordingly, it is an object of the present invention to provide a method of counting articles without having to renew the unit weight of the articles each time the articles are counted.

Another object of the present invention is to provide a method of counting articles with the unit weight thereof renewed only when necessary.

Still another object of the present invention is to provide a method of counting articles without having to effect arithmetic operations for finding the unit weight of the articles each time the articles are counted.

A further object of the present invention is to provide a method of counting articles wherein the unit weight thereof is not renewed when a computed unit weight falls outside of a preset range.

A still further object of the present invention is to provide a method of counting articles accurately.

A still further object of the present invention is to provide an article counting method which is suitable for counting articles having unit weights which differ slightly and are subject to a gradual change.

Other features and advantages of the invention will be apparent from the following description taken in connection with the accompanying drawings.

DESCRIPTION OF THE PREFERRED EMBODIMENTS

Figure 1:
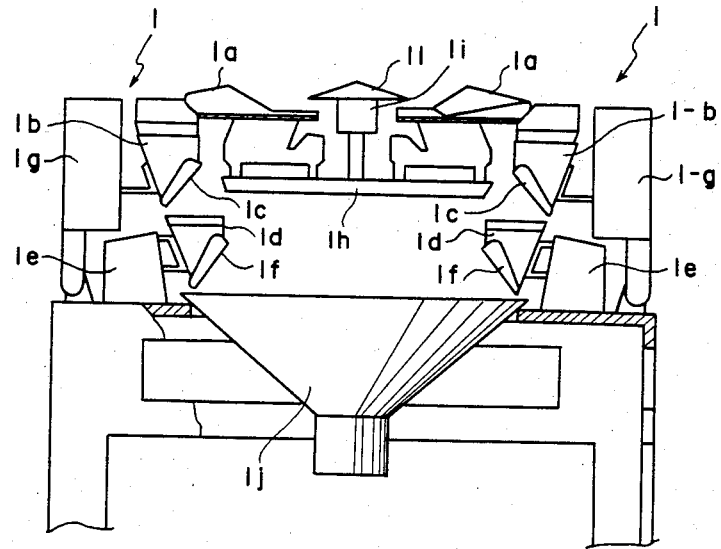
FIG. 1 is a side elevational view of an article counting apparatus to which the present invention is applicable.
Figure 2:
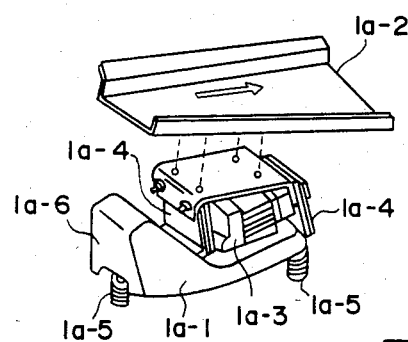
FIG. 2 is an exploded perspective view of a portion of a dispersing feeder in the apparatus shown in FIG. 1.
Figure 4:
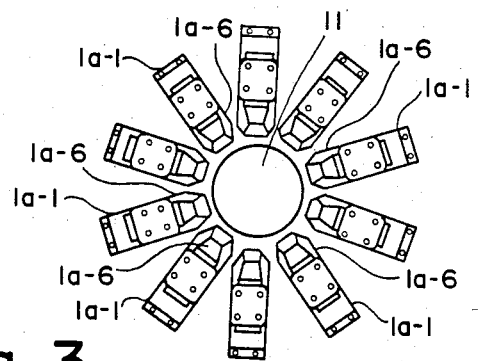
FIG. 4 is a plan view of a portion of the weighing station of FIG. 1, including the dispersing feeder illustrated in FIG. 2.
Figure 3:
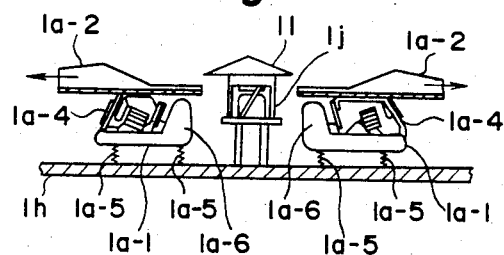
FIG. 3 is a front elevational view of a portion of the weighing station 1 of FIG. 1, including the dispersing feeder shown in FIG. 2.

The present invention will be described in detail with reference to the embodiments illustrated in the drawings.

Figure 5:
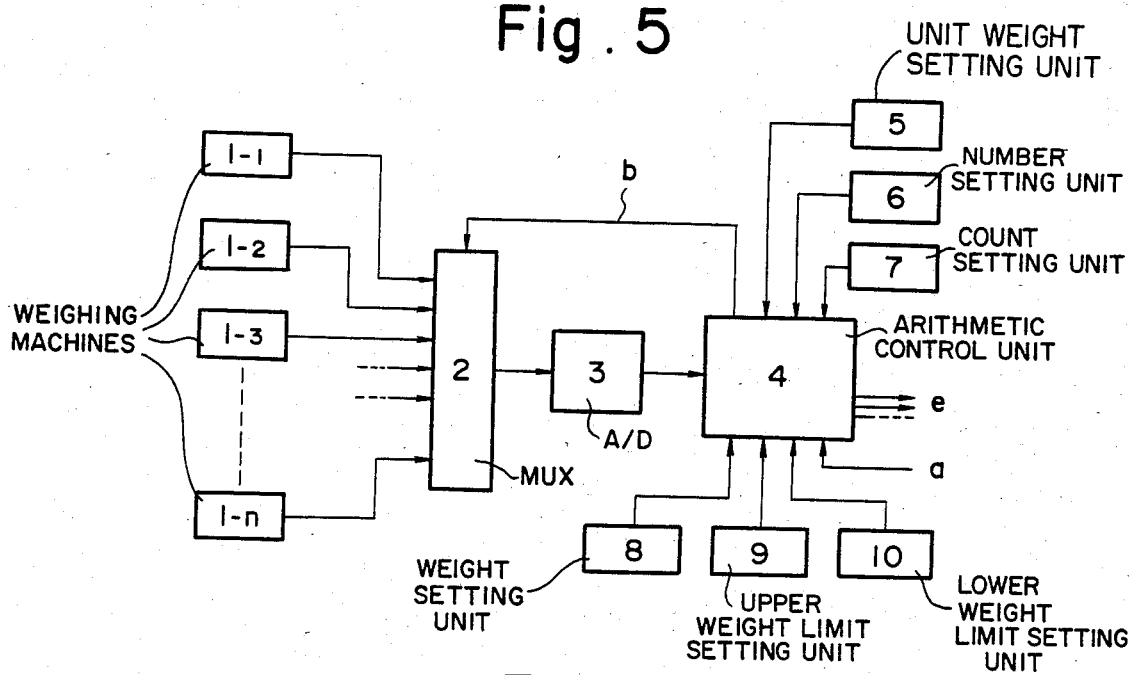
FIG. 5 is a block diagram of a first embodiment of the present invention.

Designated in FIG. 5 at 1-1, . . . 1-n are n weighing machines connected to weighing hoppers of the type described above, 2 is a multiplexer composed of analog switches for successively delivering analog weight voltages from the weighing machines 1-1, . . . 1-n in response to a selection signal b, 3 an A/D converter for converting the analog voltage fed from the multiplexer 2 into a digital weight signal, 4 an arithmetic control unit comprising a microcomputer for example, and 5 a unit weight setting unit for setting the unit weight of an article. Also, indicated at 6 is a number setting unit for setting the number of articles to be counted, 7 a count setting unit for determining how many times articles should be counted prior to unit weight renewal, 8 a weight setting unit for setting the total weight of a number of articles which are set by the number setting unit 6, 9 an upper weight limit setting unit for setting an upper weight limit for the total weight of a number of articles which has been set, and 10 a lower weight limit setting unit for setting a lower weight limit for the total weight. These setting units 5 through 10 include memories.

Figure 6:
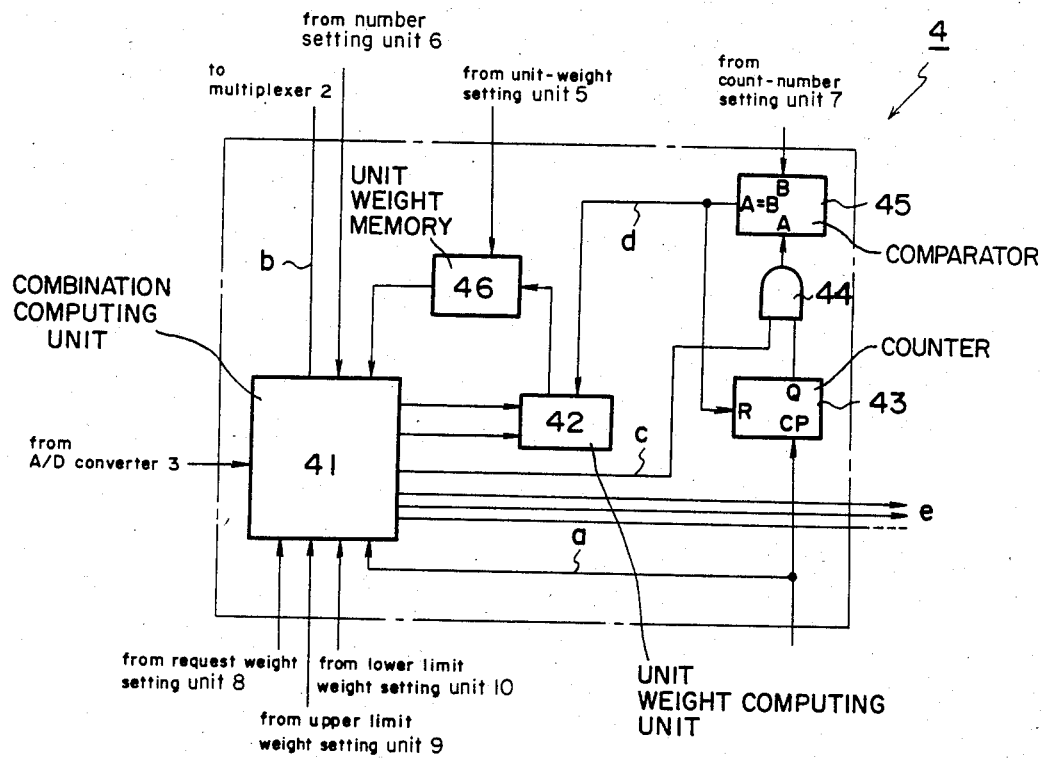
FIG. 6 is a block diagram of an arithmetic control unit in the arrangement of FIG. 5.

FIG. 6 is a block diagram which illustrates in detail the arithmetic control unit 4 shown in FIG. 5. The arithmetic control unit 4 comprises a combination computing unit 41 for effecting computations to find combinations of groups of articles based on weight value signals supplied from the n weighing machines 1-1, . . . 1-n through the multiplexer 2 and the A/D converter 3, the combination computing unit 41 being composed of an arithmetic circuit comprising a microprocessor and a memory. The combination computing unit 41 is supplied with data stored in the weight setting unit 8, the upper weight limit setting unit 9, the lower weight limit setting unit 10, the number setting unit 6 and a unit weight memory 46 (described below), and a start signal. The arithmetic control unit 4 also includes a unit weight computing unit 42 for dividing the weight of combined article groups, as computed by the combination computing unit 41, by a set number to find a new unit weight. The unit weight computing unit 42 effects computations only when a computation command signal d is issued from a comparator 45 (described below), and supplies the result of such computations to the unit weight memory 46 (described below). Designated at 43 is a counter for counting up a signal each time the start signal a is supplied to the combination computing unit 41; 44 is an AND circuit for delivering an output from the counter 43 when supplied with a comparison start command signal c from the combination computing unit 41; and 45 is a comparator for comparing a count number A supplied from the counter 43 with a count number B that is set in the count setting unit 7 and for applying as an output a computation command signal d to the unit weight computing unit 42 on coincidence. The arithmetic control unit 4 further comprises the unit weight memory 46 for storing data on a unit weight as computed in the unit weight computing unit 42. The unit weight memory 46 serves to store a unit weight that is set in the unit weight setting unit 5 until a unit weight is computed by the unit weight computing unit 42.

Figure 7:
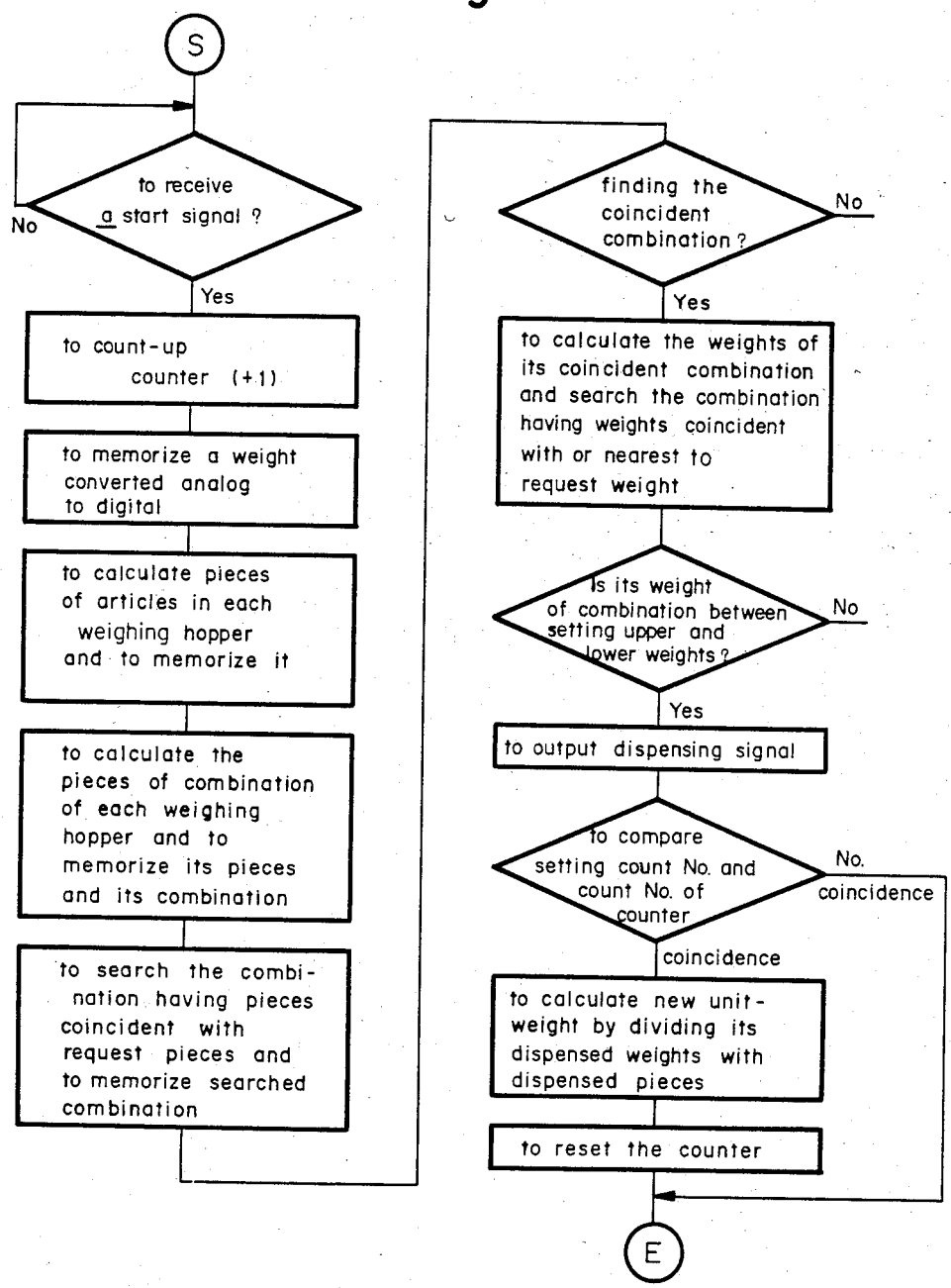
FIG. 7 is a flowchart illustrative of the operations of the embodiment of FIG. 5.

Operation of the arithmetic control unit 4 will be described with reference to the flowchart of FIG. 7.

It is assumed that a multiplicity of articles are divided and charged in the n weighing hoppers. At a step 1, when the arithmetic control unit 4 is supplied with the start signal a from a packaging machine (not shown) for packing counted articles, the counter 43 in the arithmetic control unit 4 starts counting up a clock signal. Then, the arithmetic circuit in the combination computing unit 41 is energized to issue a selection signal b to the multiplexer 2 at a step 2. The multiplexer 2 is responsive to the selection signal b for delivering analog weight voltages from the weighing hoppers 1-1, . . . 1-n successively to the A/D converter 3, and the weight data items (as converted into digital signals) are stored in the memory of the combination computing unit 41 in the arithmetic control unit 4. At a step 3, the arithmetic circuit in the combination computing unit 41 divides each of the weights stored in the memory thereof by a unit weight stored in the unit weight memory 46, and rounds each quotient to produce data in integers, thereby converting the weights of the articles contained in the weighing hoppers 1-1, . . . 1-n into article numbers, which are stored again in the memory. The combination computing unit 41 then effects combination computations to find a combination of groups of articles the number of which agrees with a set number at a step 4. More specifically, with the n weighing hoppers, ($2^n-1$) combinations of the weighing hoppers are available, and hence ($2^n-1$) combination codes which indicate these combinations of the weighing hoppers, respectively, are prepared. The numbers of articles contained in the weighing hoppers, which correspond to the combination codes, are added to find a combination of groups of articles the number of which coincides with the set number. For example, if n=10, then a combination code "0000100001" indicates a combination of the 1st and 5th weighing hoppers. Thus, the arithmetic circuit in the combination computing unit 41 adds the stored numbers of the articles charged in the weighing hoppers 1-1, . . . 1-n according to all of the combination codes to determine combined numbers of the articles, and stores the combined numbers and the combination codes as pairs in the memory. The arithmetic circuit in the combination computing unit 41 then compares a set number as set in the number setting unit 6 with all of the combined numbers stored in the memory to search for one of the combination codes which gives number coincidence, and stores such one of the combination codes in the memory. When there is no combination which gives number, coincidence, an alarm lamp is turned on.

At a step 5, the arithmetic circuit in the combination computing unit 41 adds the stored weights of the articles in the weighing hoppers 1-1, . . . 1-n based on the combination code which provides coincidence between the combined number and the set number to determine combined weights, finds one of such combined weights which is equal or closest to the set weight as set in the weight setting unit 8, and stores the determined combined weight and its combination code in the memory. The stored combined weight is compared with the upper weight limit as set in the upper weight limit setting unit 9 and the lower weight limit as set in the lower weight limit setting unit 10. When the combined weight does not fall between the upper and lower weight limits, the alarm lamp is energized, and when the combined weight is found between the upper and lower weight limits, the combination computing unit 41 issues a discharge signal e according to the combination code for such combined weight. The articles are then discharged from the weighing hoppers which are actuated by the discharge signal e through the collecting chute toward the packaging machine.

The combination computing unit 41 then supplies the comparison start signal c to the AND circuit 44 at a step 6, which delivers the count number as counted by the counter 43 to the comparator 45, at a step 6. The comparator 45 now compares the count number fed from the counter 43 with the count number as preset in the count setting unit 7. If the number of counting operations as counted in the counter 43 does not reach the number of counting operations as set in the count setting unit 7, then the comparator 45 produces no computation command signal d as its output. Therefore, the unit weight computing unit 42 effects no computations, and data in the unit weight memory 46 is not renewed. The counting operation is thus completed.

Thereafter, a fresh supply of articles is charged into the weighing hoppers from which the articles have previously been discharged. When the start signal a is again supplied from the packaging machine to the arithmetic control unit 4, the weights of the articles contained in the weighing hoppers 1-1, . . . 1-n are stored in the manner described above, and are divided by the unit weight stored in the unit weight memory 16. The quotients are rounded into data expressed in integers to thereby convert the weights of the articles in the weighing hoppers 1-1, . . . 1-n into numbers thereof which are stored in the memory. As with the previous procedure, a combination of article groups is found which has a combined number of articles equal to the set number and has a combined weight equal or closest to the set weight between the upper and lower weight limits. Then, the discharge signal e is supplied again from the combination computing unit 41 based on the combination of article groups thus found. At the same time, the combination computing unit 41 supplies the comparison signal c to the AND circuit 44. When the number of counting operations as counted by the counter 43 falls short of the number of counting operations as set in the count setting unit 7, the counting operation is brought to an end as described above.

The foregoing cycle of operation is repeated again. When the count number supplied from the counter 43 to the comparator 45 agrees with the count number fed from the count setting unit 7 after the counting operation is repeated several times, the comparator 45 supplies the computation command signal d to the unit weight computing unit 42 and simultaneously resets the counter 43, as at step 7. The unit weight computing unit 42 then divides the combined weight which has been computed by the combination computing unit 41 and stored in the memory and is equal or closest to the total weight of the articles discharged or the set weight, by the number of the discharged articles or the set number to determine a new unit weight, which is then supplied to the unit weight memory 46 for renewing the unit weight stored therein. The unit weight is renewed each time a certain number of counting operations are performed in the manner described above.

It is now assumed that there are five combinations which give coincidence between combined numbers of articles and a set number, and combined weights are 199 g, 200 g, 196 g, 197 g and 194 g, respectively with the set weight being 200 g. The articles are discharged in a combination which gives the combined weight of 200 g, which is divided by the combined number of the articles to find a new unit weight. Where the combined weights are distributed such that almost all of them are smaller (or larger) than the set weight, the combined weight which is equal or closest to the set weight should not be divided, but the median combined weight (197 g in the above example) out of the above combined weights should be divided by the combined number for the determination of a more correct unit weight. According to the present invention, therefore, one of the combinations which gives coincidence between combined numbers and a set number is found which has the combined weight equal or closest to the set weight, then the combined weights of combinations of the articles the number of which is equal to the set number are rearranged in order of magnitude thereof, and the median combined weight in such a series of combined weights is divided by its combined number to find a new unit weight.

The renewal of the unit weight has been described as being carried out each time a certain number of counting operations are effected. Such unit weight renewal may be done at an interval of time which is set by a timer, or by counting clock pulses, instead of the start signal a, in the counter 43.

Although in the embodiment illustrated in FIGS. 5 and 6 the weights are converted into digital quantities for arithmetic operations, the present invention is also applicable to arithmetic operations using analog quantities. Such a modification will now be described with reference to FIG. 8.

Figure 8:
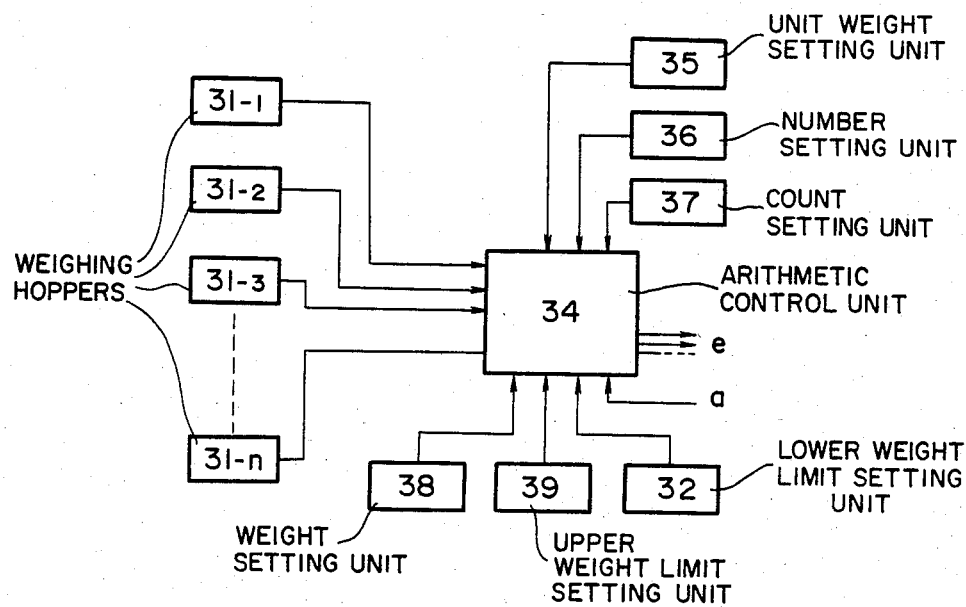
FIG. 8 is a block diagram of an arrangement in which analog arithmetic operations are effected to achieve the arrangement of FIG. 5.

In FIG. 8, analog voltages indicative of weights are supplied from n weighing hoppers 31-1, . . . 31-n to an arithmetic control unit 34 having a memory for storing the analog weight voltages directly. Designated at 35 is a unit weight setting unit for setting article weights in analog voltages, 36 a number setting unit for setting article numbers in analog voltages, 37 a count setting unit, 38 a unit weight setting unit for setting in an analog voltage the total weight of articles the number of which is set by the number setting unit 36, 39 an upper weight limit setting unit for setting in an analog voltage an upper weight limit for the total weight of the articles the number of which has been set, and 32 a lower weight limit setting unit for setting in an analog voltage a lower weight limit for the total weight of the articles the number of which has been set. When a start signal a is supplied from a pakaging machine for packing the counted articles, to the arithmetic control unit 34, combinatorial counting operation is effected and new unit weights are computed substantially in the same manner as that for the embodiment shown in FIGS. 5 and 6.

With the first embodiment of the present invention, the number of articles in the weighing hoppers is computed on the basis of a preset unit weight during a certain number of combinatorial counting operations or during a certain interval of time. When a certain number of counting operations are effected, or a certain interval of time has elapsed from the starting of the counting, a new unit weight is computed on the basis of the data available at that time to renew the unit weight. The number of articles is computed subsequently on the basis of the renewed unit weight until a certain number of counting operations are carried out or a certain length of time elapses again.

Since in the above embodiment unit weights are computed each time a certain number of counting operations is effected or at a certain interval of time, the new unit weights which are obtained substantially agree with actual unit weights of articles which change gradually, so that correct unit weights can be determined and the number of articles can be found accurately. New unit weights can be computed without performing unnecessary arithmetic operations which would conventionally be effected to compute unit weights each time a counting operation was carried out, even when determined unit weights did not change widely because of small differeneces between actual unit weights.

Another embodiment according to the present invention will be described with reference to FIGS. 9 through 12.

Figure 9:
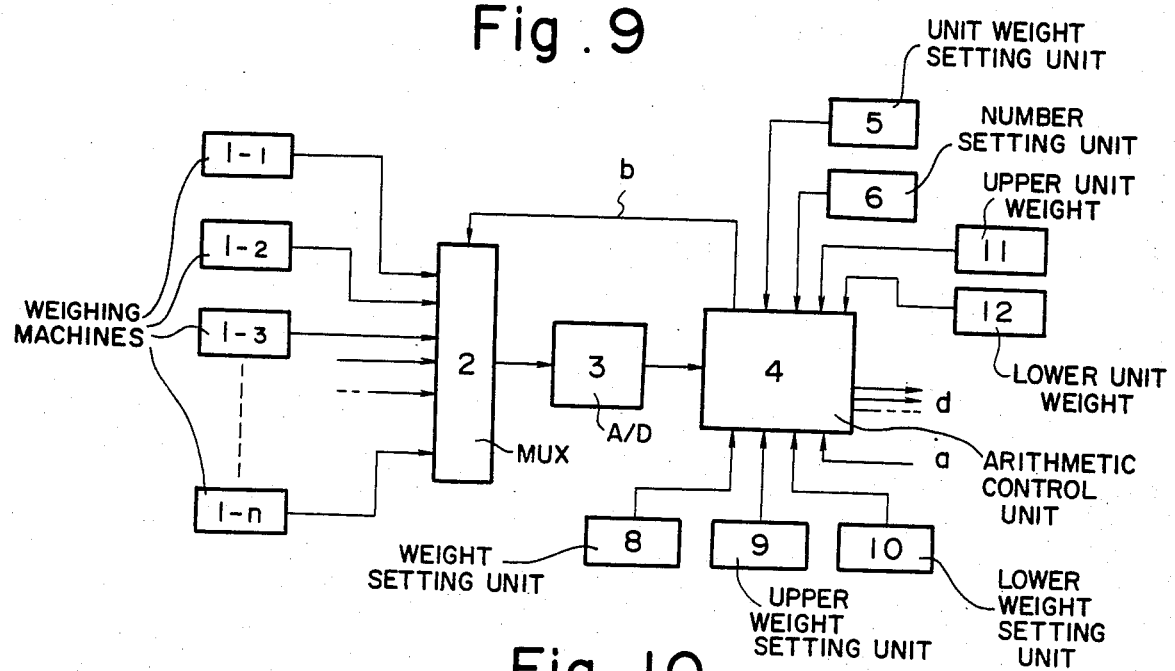
FIG. 9 is a block diagram of a second embodiment of the present invention.

Identical parts in FIG. 9 are denoted by identical reference characters in FIG. 5. Designated at 1-1, . . . 1-n are n weighing machines, 2 a multiplexer, 3 an A/D converter, 4 an arithmetic control unit, 5 a unit weight setting unit, 6 a number setting unit, 8 a weight setting unit, 9 an upper unit weight limit setting unit, and 10 a lower unit weight limit setting unit. Also indicated at 11 is an upper weight limit setting unit for setting an upper weight limit for a set weight, and 12 is a lower weight limit setting unit for setting a lower weight limit for a set weight.

Figure 10:
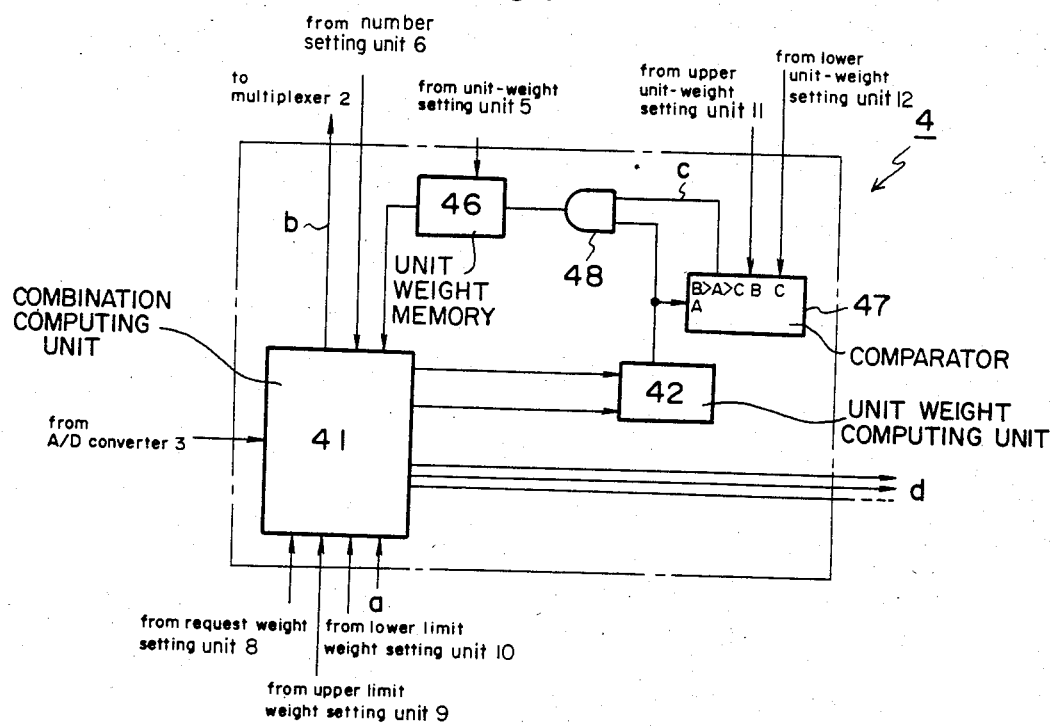
FIG. 10 is a block diagram of an arithmetic control unit in the arrangement shown in FIG. 9.

FIG. 10 is a block diagram which shows the arithmetic control unit 4 in detail. The arithmetic control unit 4 comprises a combination computing unit 41 for effecting computations to find combinations of groups of articles based on weight value signals supplied from the n weighing machines 1-1, . . . 1-n through the multiplexer 2 and the A/D converter 3, the combination computing unit 41 being composed of a microprocessor and a memory. The combination computing unit 41 is supplied with data stored in the weight setting unit 8, the upper weight limit setting unit 9, the lower weight limit setting unit 10, the number setting unit 6 and a unit weight memory 46, and a start signal. The arithmetic control unit 4 also includes a unit weight computing unit 42 for dividing the weight of combined article groups as computed by the combination computing unit 41 by a set number to find a new unit weight. The result of computation in the unit weight computing unit 42 is supplied to a comparator 47 and an AND circuit 48. The comparator 47 compares a unit weight A computed by the unit weight computing unit 42 with upper and lower limits B, C for the unit weight set by the upper and lower unit weight setting units 10, 11, respectively, and for supplying a stored-data renewal signal $\bar{c}$ to the AND circuit 48 (described below) when the unit weight A is smaller than the upper weight limit B and larger than the lower weight limit C, that is, when $B>A>C$. The AND circuit 48 serves to take the AND between a signal supplied from the unit weight computing unit 42 and a signal supplied from the comparator 47. The unit weight memory 46 stores the unit weight computed by the unit weight computing unit 42. The unit weight memory 46 continues to store the unit weight as set in the unit weight setting unit 5 until the first counting operation is finished.

Figure 11:
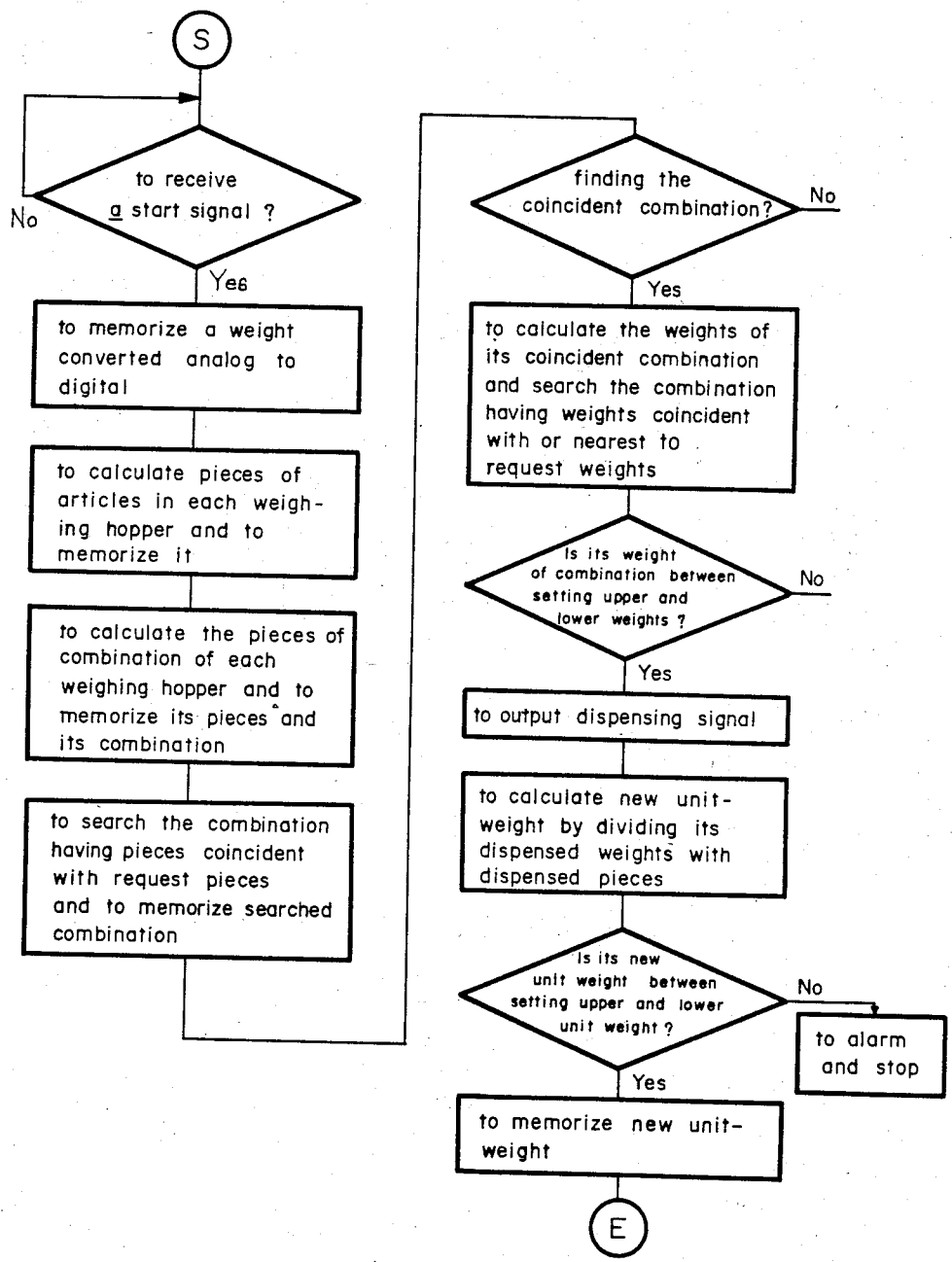
FIG. 11 is a flowchart illustrating the operations of the embodiment of FIG. 9.

Operation of the arithmetic control unit will be described with reference to the flowchart of FIG. 11. First, the steps 2 through 5 which have been described with reference to FIGS. 5 through 7 are performed. More specifically, it is assumed that a multiplicity of articles are divided and charged in the n weighing hoppers. At a step 2, when the arithmetic control unit 4 is supplied with the start signal a from a packaging machine (not shown) for packing counted articles, a selection signal $\bar{b}$ is delivered from the combination computing unit 41 to the multiplexer 2. Then, the multiplexer 2 is responsive to the selection signal $\bar{b}$ for delivering analog weight voltages from the weighing hoppers 1-1, . . . 1-n successively to the A/D converter 3, and the weight data items as converted into digital signals are stored in the combination computing unit 41 in the arithmetic control unit 4. At a step 3, each of the weights stored in the combination computing unit 41 is divided by a unit weight stored in the unit weight memory 46, and each quotient is rounded to produce data in integers, thereby converting the weights of the articles contained in the weighing hoppers 1-1, . . . 1-n into article numbers, which are stored again.

The combination computing unit 41 then (at a step 4) adds stored numbers of the articles charged in the weighing hoppers 1-1, . . . 1-n according to all combination codes to determine combined numbers of the articles, and stores the combined numbers and the combination codes as pairs in the memory. The combination computing unit 41 then compares a set number, as set in the number setting unit 6, with all of the combined numbers stored in the memory to search for one of the combination codes which gives number coincidence, and stores such one of the combination codes therein. When there is no combination which gives number coincidence, an alarm lamp is turned on.

At a step 5, the combination computing unit 41 adds the stored weights of the articles in the weighing hoppers 1-1, . . . 1-n based on the combination code which provides coincidence between the combined number and the set number to determine combined weights, finds one of such combined weights which is equal or closest to the set weight as set in the weight setting unit 8, and stores the determined combined weight and its combination code in the memory. The stored combined weight is compared with the upper weight limit as set in the upper weight limit setting unit 9 and the lower weight limit as set in the lower weight limit setting unit 10. When the combined weight does not fall between the upper and lower weight limits, the alarm lamp is energized, and when the combined weight is found between the upper and lower weight limits, the combination computing unit 41 issues a discharge signal $\bar{d}$ according to the combination code for such combined weight. The articles are then discharged from the weighing hoppers which are actuated by the discharge signal $\bar{d}$ through the collecting chute toward the packaging machine. The number of articles which is the same as the set number, is then packed in a package in the packaging machine.

At a step 6, the unit weight computing unit 42 divides the combined weight which is equal or closest to the weight of the articles computed by the combination computing unit 41 and just discharged, that is, the set weight, by the number of the articles discharged, or the set number to find a new unit weight, the value of which is supplied to the AND circuit 48 and the comparator 47. The comparator 47 compares the new unit weight A computed by the unit weight computing unit 42 with the upper unit weight limit B set by the upper unit weight limit setting unit 11 and the lower unit weight limit C set by the lower unit weight setting unit 12. When the new unit weight A falls between the upper and lower unit weight limits B, C, the comparator 47 supplies the stored-data renewal signal $\bar{c}$ to the AND circuit 48. When the stored-data renewal signal $\bar{c}$ is supplied to the AND circuit 48, the latter delivers the new unit weight computed by the unit weight computing unit 42 to the unit weight memory 46, in which the unit weight is renewed, and the counting operation is brought to an end.

Thereafter, a fresh supply of articles is charged into the weighing hoppers from which the articles have previously been discharged. When the start signal a is again supplied from the packaging machine to the arithmetic control unit 4, the weights of the articles contained in the weighing hoppers 1-1, . . . 1-n are stored in the manner described above, and are divided by the unit weight computed and stored in the unit weight memory 16 in the previous counting operation. The quotients are rounded into data expressed in integers to thereby convert the weights of the articles in the weighing hoppers 1-1, . . . 1-n into numbers thereof which are stored in the memory. As with the previous procedure, a combination of article groups is found which has a combined number of articles equal to the set number and has their combined weight equal or closest to the set weight between the upper and lower weight limits. Then, the discharge signal d is supplied again from the combination computing unit 41 based on the combination of article groups thus found. The combined weight is divided by the set number to determine a new unit weight. When the new unit weight is found between the upper and lower unit weight limits set respectively by the upper and lower unit weight setting units 11, 12, the unit weight is renewed in the manner described above. Subsequently, a new unit weight is computed each time a combinatorial counting operation is effected, and when the new unit weight falls in a preset range, it is renewed.

When the new unit weight computed by the unit weight computing unit 42 and delivered to the comparator 47 does not fall within the range between the upper and lower unit weight limits set respectively by the upper and lower unit weight setting units 11, 12, no stored-data renewal signal c is generated by the comparator 47, and the new unit weight computed by the unit weight memory 42 is not stored in the unit weight memory 46. Simultaneously, an alarm is turned on and the counting operation is ended.

It is now assumed that there are five combinations which give coincidence between combined numbers of articles and a set number, and combined weights are 199 g, 200 g, 196 g, 197 g and 194 g, respectively with the set weight being 200 g. The articles are discharged in a combination which gives the combined weight of 200 g, which is divided by the combined number of the articles to find a new unit weight. Where the combined weights are distributed such that almost all of them are smaller (or larger) than the set weight, the combined weight which is equal or closest to the set weight should not be divided, but the median combined weight out of the above combined weights should be divided by the combined number for the determination of a more correct unit weight. According to the present invention, therefore, one of the combinations which gives coincidence between combined numbers and a set number is found which has the combined weight equal or closest to the set weight, and then the articles are discharged in the combination thus found. Thereafter, the combined weights of combinations of the articles, the number of which is equal to the set number, are rearranged in order of magnitude thereof, and the median combined weight in such a series of combined weights is divided by its combined number to find a new unit weight.

Although in the embodiment illustrated in FIGS. 9 and 10 the weights are converted into digital quantities for arithmetic operations, the present invention is also applicable to arithmetic operations using analog quantities. Such a modification will now be described with reference to FIG. 12.

Figure 12:
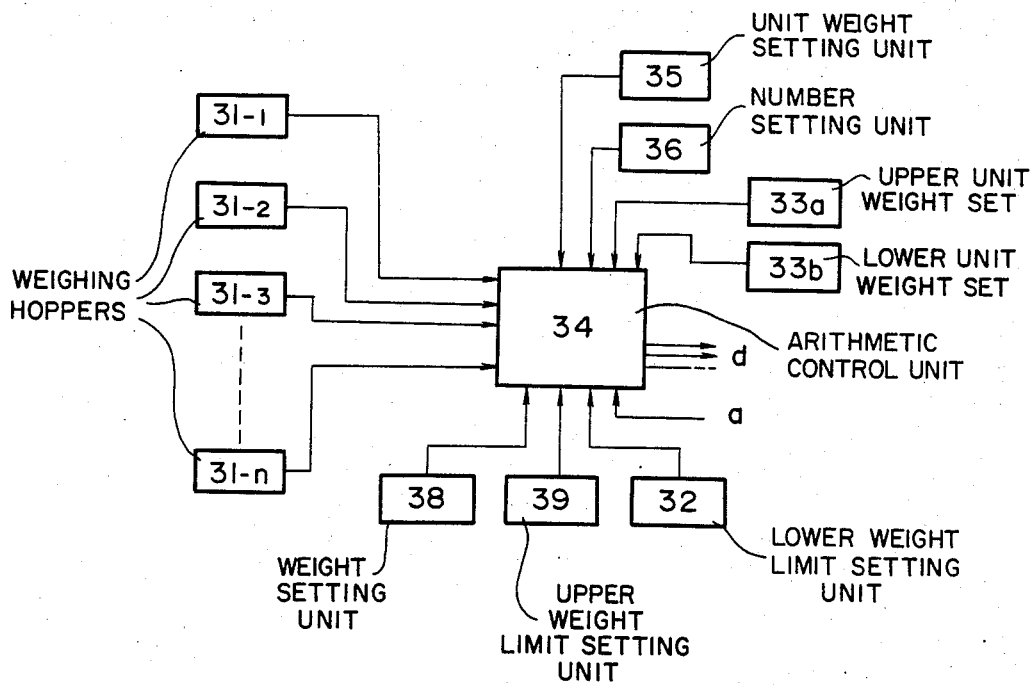
FIG. 12 is a block diagram of an arrangement in which analog arithmetic operations are carried out to achieve the arrangement of FIG. 9.

In FIG. 12, analog voltages indicative of weights are supplied from n weighing hoppers 31-1, . . . 31-n to an arithmetic control unit 34 having a memory for storing the analog weight voltages directly. Designated at 35 is a unit weight setting unit for setting article weights in analog voltages; 36, a number setting unit for setting article numbers in analog voltages; 33a, an upper unit weight setting, unit for setting in an analog voltage, an upper limit for a set unit weight; 33b, a lower unit weight setting, unit for setting in an analog voltage, a lower limit for a set unit weight; 38, a weight setting unit for setting, in an analog voltage, the total weight of articles which is set by the number setting unit 36; 39, an upper weight limit setting, unit for setting in an analog voltage, an upper weight limit for the total weight of the articles, the number of which has been set; and 32, a lower weight limit setting unit for setting, in an analog voltage, a lower weight limit for the total weight of the articles, the number of which has been set. When a start signal a is supplied from a pakaging machine for packing the counted articles, to the arithmetic control unit 34, a combinatorial counting operation is effected and new unit weights are computed substantially in the same manner as that for the embodiment shown in FIGS. 9 and 10.

With the second embodiment of the present invention, during the first combinatorial counting operation, the number of articles in each of the weighing hoppers is computed on the basis of a preset unit weight and a new unit weight is computed for a next combinatorial counting operation. The unit weight is renewed only when such a new unit weight is within a predetermined range. In the second and subsequent counting operations, the number of articles in each of the weighing hoppers is computed on the basis of the unit weight computed and stored in the previous counting operation, and a new unit weight is computed. When such a new unit weight falls within a preset range, the unit weight is renewed.

According to the second embodiment of the present invention, a new unit weight is computed each time a combinatorial counting operation is effected, on the basis of one or more weights of articles and a number of articles which is converted from such one or more weights, and when such a new unit weight falls in a predetermined range, the unit weight is renewed. Therefore, those articles which have weights that vary slightly and gradually can correctly be counted, and the weights of packages of articles can substantially be equalized.

Figure 13:
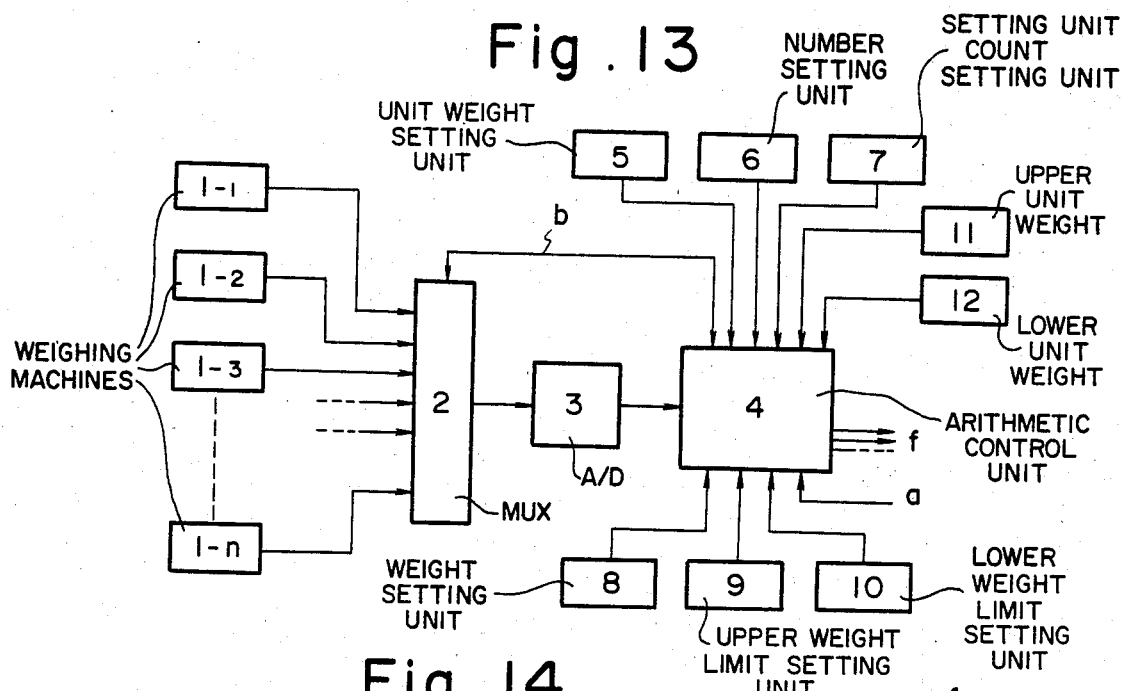
FIG. 13 is a block diagram of a third embodiment according to the present invention.

Still another embodiment of the present invention will be described with reference to FIGS. 13 through 16. FIG. 13 is a block diagram showing the third embodiment of the invention. The arrangement of FIG. 13 is a combination of those illustrated in FiGS. 5 and 9. Identical parts shown in FIG. 13 are denoted by identical reference characters in FIGS. 5 and 9.

Figure 14:
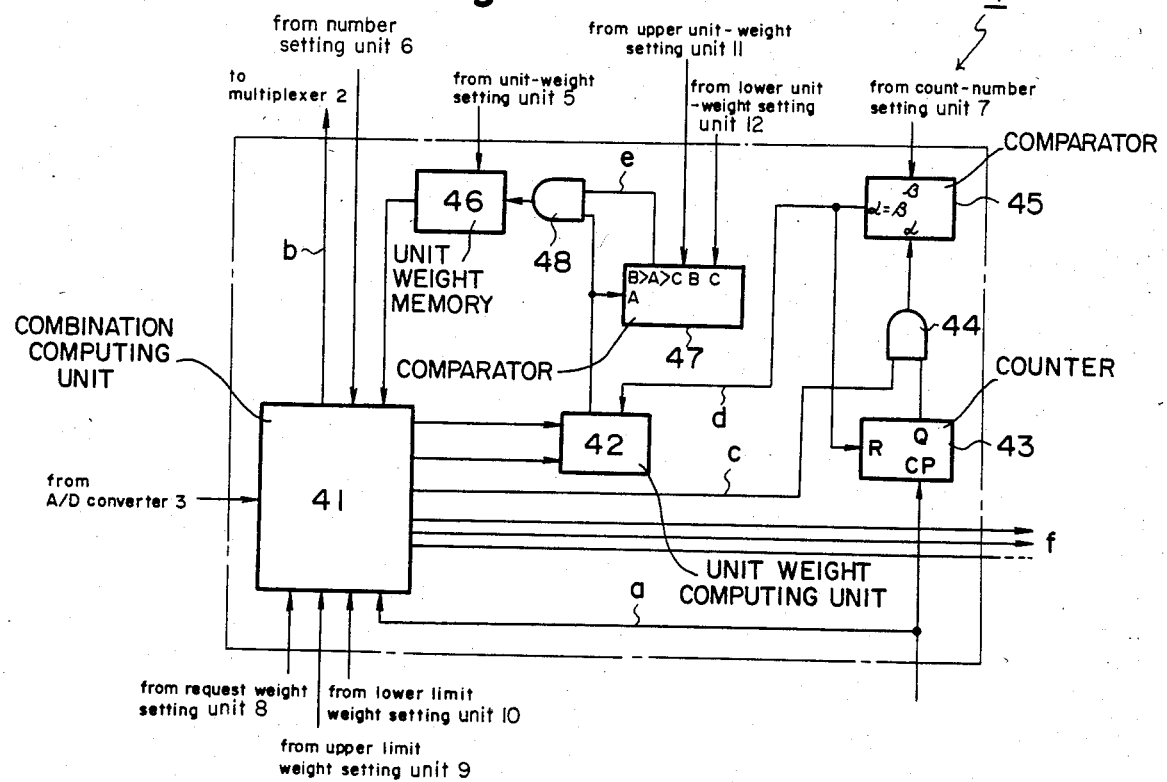
FIG. 14 is a block diagram of an arithmetic control unit in the arrangement of FIG. 13.

Designated at 1-1, . . . 1-n are n weighing machines connected to weighing hoppers of the type described above, 2 a multiplexer composed of, for example, analog switches, for successively delivering analog weight voltages from the weighing machines 1-1, . . . 1-n in response to a selection signal b, 3 an A/D converter for converting the analog voltage fed from the multiplexer 2 into a digital weight signal, 4 an arithmetic control unit comprising a microcomputer for example, 5 a unit weight setting unit for setting the unit weight of an article, 6 a number setting unit for setting the number of articles to be counted, and 7 a count setting unit for determining how many times articles should be counted prior to unit weight renewal. Also indicated at 11 is an upper unit weight setting unit for setting an upper limit for a set unit weight, 12 a lower unit weight setting unit for setting a lower limit for a set unit weight, 8 a weight setting unit for setting the total weight of a number of articles which are set by the number setting unit 6, 9 an upper weight limit setting unit for setting an upper weight limit for the total weight of a number of articles which has been set, and 10 a lower weight limit setting unit for setting a lower weight limit for the total weight. FIG. 14 is a block diagram which illustrates in detail the arithmetic control unit 4 shown in FIG. 13. The arithmetic control unit 4 is a combination of the arithmetic control units shown in FIGS. 6 and 10, and comprises a combination computing unit 41 for effecting computations to find combinations of groups of articles based on weight value signals supplied from the n weighing machines 1-1, . . . 1-n through the multiplexer 2 and the A/D converter 3. The combination computing unit 41 is supplied with data stored in the weight setting unit 8, the upper weight limit setting unit 9, the lower weight limit setting unit 10, the number setting unit 6 and a unit weight memory 46 (described below), and a start signal. The arithmetic control unit 4 also includes a unit weight computing unit 42 for dividing the weight of combined article groups, as computed by the combination computing unit 41, by a set number to find a new unit weight. The unit weight computing unit 42 effects computations only when a computation command signal $\underline{d}$ is issued from a first comparator 45 (described below), and supplies the result of such computations to a second comparator 47 and a second AND circuit 48 (described below). Designated at 43 is a counter for counting up a signal each time the start signal $\underline{a}$ is supplied to the combination computing unit 41, 44 is an AND circuit 44 for delivering an output from the counter 43 when supplied with a comparison start command signal $\underline{c}$ from the combination computing unit 41, and 45 is a first comparator for comparing a count number $\alpha$ supplied from the counter 44 with a count number $\beta$ that is preset in the count setting unit 7 and for applying as an output, a computation command signal $\underline{d}$ to the unit weight computing unit 42 and resetting the counter 43 when the count numbers agree with each other. The second comparator 47 compares a unit weight A computed by the unit weight computing unit 42 with upper and lower limits B, C for the unit weight set by the upper and lower unit weight setting units 11, 12, respectively, and for supplying a stored-data renewal signal $\underline{e}$ to the AND circuit 48 when the unit weight A is smaller than the upper weight limit B and larger than the lower weight limit C, that is, when B>A>C. The AND circuit 48 serves to issue a signal from the unit weight computing unit 42 when supplied with a signal from the second comparator 47. The unit weight memory 46 stores the unit weight computed by the unit weight computing unit 42. The unit weight memory 46 continues to store the unit weight as set in the unit weight setting unit 5 until the unit weight computed by the unit weight computing unit 42 is supplied.

Figure 15:
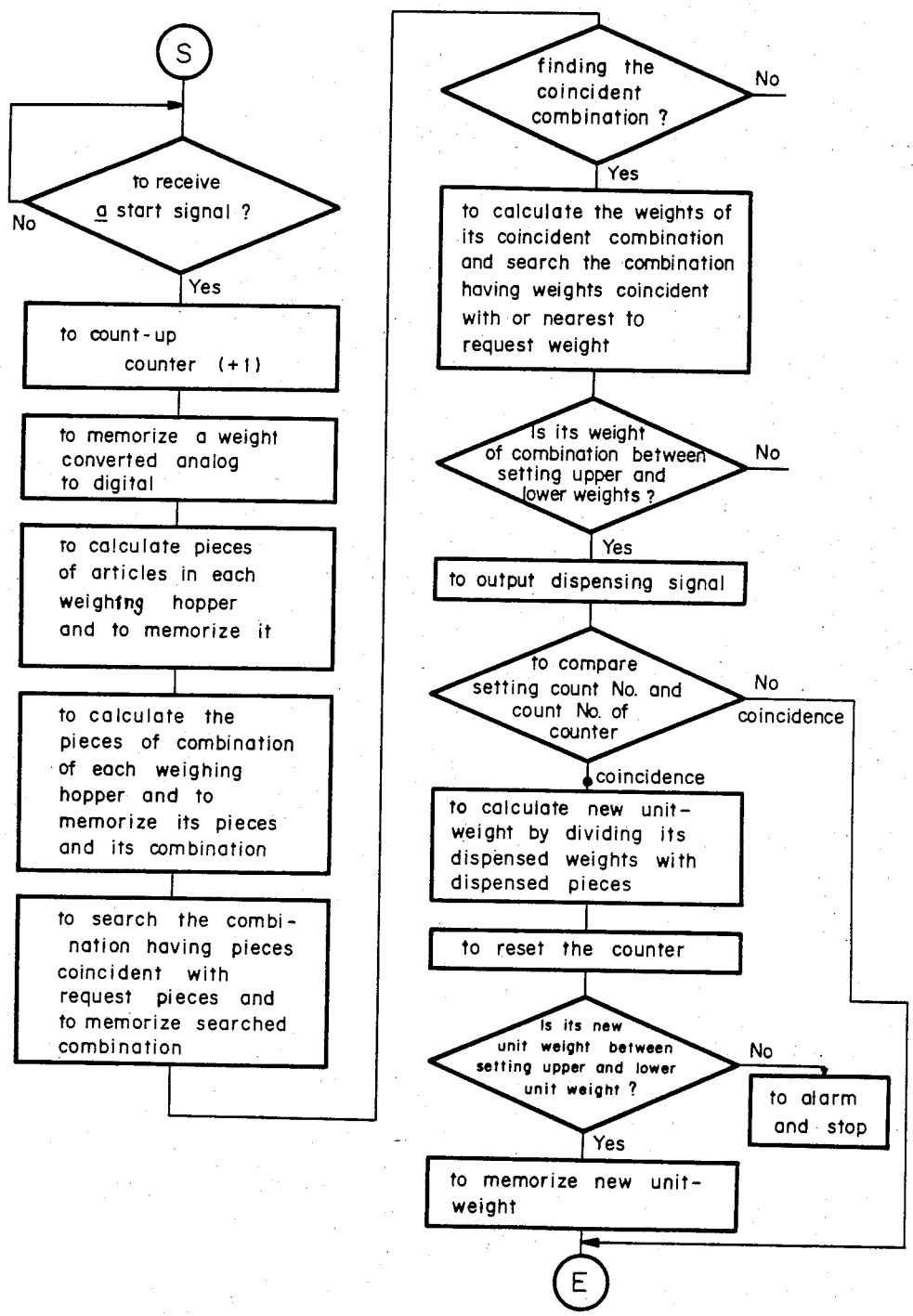
FIG. 15 is a flowchart illustrating operations of the embodiment of FIG. 13.

Operation of the arithmetic control unit will be described with reference to the flowchart of FIG. 15. The operation is the same as the steps 1 through 6 described with reference to FIGS. 5 through 7 and the step 6 described with reference to FIGS. 9 through 11. At a step 1, when the arithmetic control unit 4 is supplied with the start signal $\underline{a}$ from a packaging machine (not shown) for packing counted articles, the counter 43 in the arithmetic control unit 4 starts counting up a signal. Then, the combination computing unit 41 is energized to issue a selection signal $\underline{b}$ to the multiplexer 2 at a step 2. The multiplexer 2 is responsive to the selection signal $\underline{b}$ for delivering analog weight voltages from the weighing hoppers 1-1, . . . 1-n successively to the A/D converter 3, and the weight data items (as converted into digital signals) are stored in the combination computing unit 41 in the arithmetic control unit 4. At a step 3, the combination computing unit 41 divides each of the weights stored therein by a unit weight stored in the unit weight memory 46, and rounds each quotient to produce data in integers, thereby converting the weights of the articles contained in the weighing hoppers 1-1, . . . 1-n into article numbers, which are stored again in the memory. Then, at a step 4, the combination computing unit 41 adds the stored numbers of the articles charged in the weighing hoppers 1-1, . . . 1-n according to all of the combination codes to determine combined numbers of the articles, and stores the combined numbers and the combination codes as pairs. The combination computing unit 41 then compares a set number as set in the number setting unit 6 with all of the combined numbers stored in the memory to search for one of the combination codes which gives number coincidence, and stores such one of the combination codes therein. When there is no combination which gives number coincidence, an alarm lamp is turned on.

At a step 5, the combination computing unit 41 adds the stored weights of the articles in the weighing hoppers 1-1, . . . 1-n based on the combination code (or codes) which provides coincidence between the combined number and the set number to determine combined weights, finds one of such combined weights which is equal or closest to the set weight as set in the weight setting unit 8, and stores the determined combined weight and its combination code therein. The stored combined weight is compared with the upper weight limit as set in the upper weight limit setting unit 9 and the lower weight limit as set in the lower weight limit setting unit 10. When the combined weight does not fall between the upper and lower weight limits, the alarm lamp is energized, and when the combined weight is found between the upper and lower weight limits, the combination computing unit 41 issues a discharge signal f according to the combination code for such combined weight. The articles are then discharged from the weighing hoppers which are actuated by the discharge signal f through the collecting chute toward the packaging machine. The articles which are as many as the set number are then packed in a package in the packaging machine.

The combination computing unit 41 then supplies the comparison start signal $\underline{c}$ to the first AND circuit 44 at a step 6, which delivers the count number as counted by the counter 43 to the first comparator 45, at a step 6. The comparator 45 now compares the count number fed from the counter 43 with the count number as preset in the count setting unit 7. If the number of counting operations as counted by the counter 43 has not reached the number of counting operations as set in the count setting unit 7, then the first comparator 45 produces no computation command signal f as its output. Therefore, the unit weight computing unit 42 effects no computations, and data in the unit weight memory 46 is not renewed. The counting operation is thus completed.

Thereafter, a fresh supply of articles is charged into the weighing hoppers from which the articles have previously been discharged. When the start signal a is again supplied from the packaging machine to the arithmetic control unit 4, the weights of the articles contained in the weighing hoppers 1-1, . . . 1-n are stored in the manner described above, and are divided by the unit weight stored in the unit weight memory 16. The quotients are rounded into data expressed in integers to thereby convert the weights of the articles in the weighing hoppers 1-1, . . . 1-n into numbers thereof which are stored in the memory. As with the previous procedure, a combination of article groups is found which has a combined number of articles equal to the set number and which has a combined weight equal or closest to the set weight, between the upper and lower weight limits. Then, the discharge signal f is supplied again from the combination computing unit 41 based on the combination of article groups thus found. At the same time, the combination computing unit 41 supplies the comparison start signal c to the first AND circuit 44. When the number of counting operations as counted by the counter 43 falls short of the number of counting operations set in the count setting unit 7, the unit weight computing unit 42 effects no computations as described above.

The foregoing cycle of operation is repeated again. When the count number supplied from the counter 43 to the first comparator 45 agrees with the count number fed from the count setting unit 7 as the counting operation is repeated several times, the comparator 45 supplies the computation command signal d to the unit weight computing unit 42 and simultaneously resets the counter 43, as at step 7. The unit weight computing unit 42 then divides the combined weight which has been computed by the combination computing unit 41 and is equal or closest to the total weight of the articles discharged or the set weight, by the number of the discharged articles or the set number to determine a new unit weight, which is then supplied to the second AND circuit 48 and the second comparator 47. The second comparator 47 compares the new unit weight A computed by the unit weight computing unit 42 with the upper unit weight limit B set by the upper unit weight limit setting unit 11 and the lower unit weight limit C set by the lower unit weight setting unit 12. When the new unit weight A falls between the upper and lower unit weight limits B, C, the second comparator 47 supplies the stored-data renewal signal e to the second AND circuit 48. When the stored-data renewal signal e is supplied to the second AND circuit 48, the latter delivers the new unit weight computed by the unit weight computing unit 42 to the unit weight memory 46, in which the unit weight is renewed. Likewise, a new unit weight is computed each time a certain number of counting operations are carried out, and when such a new unit weight falls in a preset range, the unit weight is renewed.

When the first comparator 45 issues the computation command signal d, the unit weight computing unit 42 computes and supplies a new unit weight to the second comparator 47. When such a new unit weight is outside of the range defined between the upper and lower unit weight limits preset by the upper and lower unit weight setting units 11, 12, respectively, no stored-data renewal signal e is issued by the second comparator 47. Therefore, the new unit weight which is computed by the unit weight computing unit 42 is not stored in the unit weight memory 46. At the same time, the alarm lamp is energized and the counting operation comes to an end.

It is now assumed that there are five combinations which give coincidence between combined numbers of articles and a set number, and combined weights are 199 g, 200 g, 196 g, 197 g and 194 g, respectively with the set weight being 200 g. The articles are discharged in a combination which gives the combined weight of 200 g, which is divided by the combined number of the articles to find a new unit weight. Where the combined weights are distributed such that almost all of them are smaller (or larger) than the set weight, the combined weight which is equal or closest to the set weight should not be divided, but the median combined weight, out of the above combined weights, should be divided by the combined number for the determination of a more correct unit weight. According to the present invention, therefore, one of the combinations which gives coincidence between combined numbers and a set number is found which has the combined weight equal or closest to the set weight, and then the articles are discharged in the combination thus found. Thereafter, the combined weights of combinations of the articles the number of which is equal to the set number are rearranged in order of magnitude thereof, and the median combined weight in such a series of combined weights is divided by its combined number to find a new unit weight.

The renewal of the unit weight has been described as being carried out each time a certain number of counting operations are effected. Such unit weight renewal may be done at an interval of time which is set by a timer, or by counting clock pulses, instead of the start signal a, in the counter 43.

Although in the embodiment illustrated in FIGS. 13 and 14 the weights are converted into digital quantities for arithmetic operations, the present invention is also applicable to arithmetic operations using analog quantities. Such a modification will now be described with reference to FIG. 16.

Figure 16:
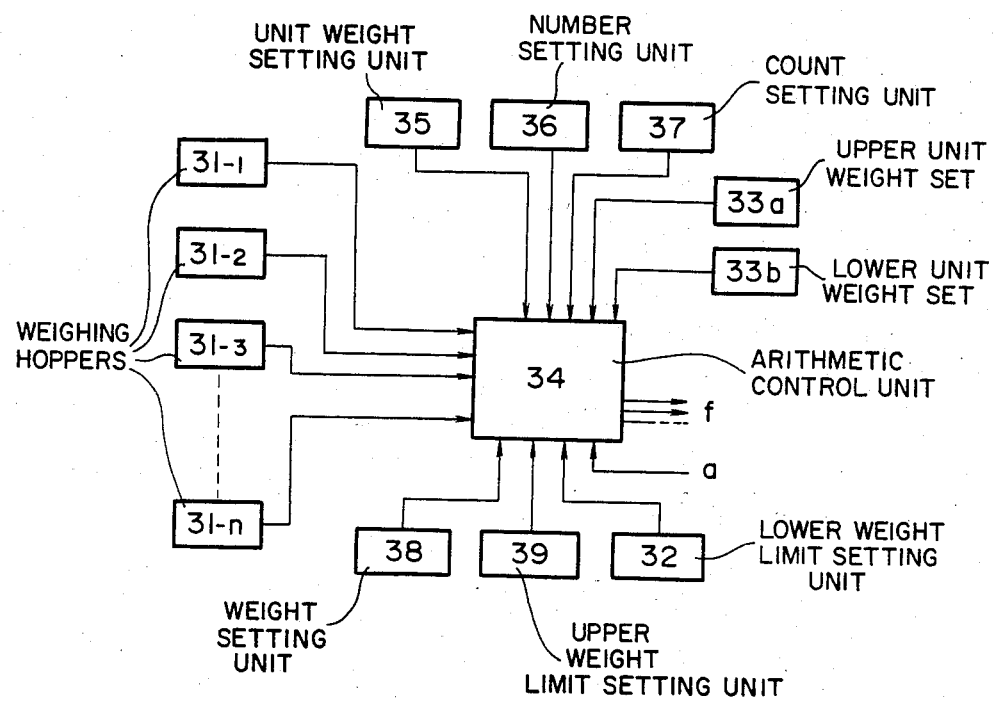
FIG. 16 is a block diagram of an arrangement in which analog arithmetic operations are performed to achieve the arrangement shown in FIG. 13.

In FIG. 16, analog voltages indicative of weights are supplied from n weighing hoppers 31-1, . . . 31-n to an arithmetic control unit 34 having a memory for storing the analog weight voltages directly. Designated at 35 is a unit weight setting unit for setting article weights in analog voltages; 36, a number setting unit for setting article numbers in analog voltages; 37, a count setting unit, 33a an upper unit weight setting unit for setting, in an analog voltage, an upper limit for a set unit weight; 33b, a lower unit weight setting, unit for setting in an analog voltage, a lower limit for a set unit weight; 38, a weight setting, unit for setting in an analog voltage, the total weight of articles which is set by the number setting unit 36; 39, an upper weight limit setting, unit for setting in an analog voltage, an upper weight limit for the total weight of the articles, the number of which has been set; and 32, a lower weight limit setting, unit for setting in an analog voltage, a lower weight limit for the total weight of the articles, the number of which has been set. When a start signal a is supplied from a packaging machine for packing the counted articles, to the arithmetic control unit 34, a combinatorial counting operation is effected and new unit weights are computed substantially in the same manner as that for the embodiment shown in FIGS. 13 and 14.

With the third embodiment of the present invention, the number of articles in the weighing hoppers is computed on the basis of a preset unit weight during a certain number of combinatorial counting operations or during a certain interval of time. When a certain number of counting operations are effected, or a certain interval of time has elapsed from the start of the counting, a new unit weight is computed on the basis of the data available at that time to renew the unit weight. The number of articles is computed subsequently on the basis of the renewed unit weight until a certain number of counting operations are carried out or a certain length of time elapses again.

Since in the above embodiment unit weights are computed each time a certain number of counting operation are effected or at a certain interval of time, and the unit weight is renewed when such new units fall within a preset range, the number of articles which have actual unit weights that vary slightly and gradually, can be counted accurately. New unit weights can be computed without performing unnecessary arithmetic operations which would conventionally be effected to compute unit weights each time a counting operation was carried out, even when determined unit weights did not change widely because of small differences between actual unit weights.

A modification of the embodiments of the present invention will now be described. Such a modification can be illustrated by a block diagram which is the same as those shown in FIGS. 5 and 6 or 8 for the first embodiment, those shown in FIGS. 9 and 10 or 12 for the second embodiment, and those shown in FIGS. 13 and 14 or 16 for the third embodiment. Operation of the modified arrangement is also the same as the steps in the flowchart of FIG. 7 or 15 up to the issuance of the discharge signal and comparison between the number of counting operations as counted by the counter and the preset number of counting operations, or the steps in the flowchart of FIG. 11 up to the issuance of the discharge signal. According to the modification, however, a unit weight is computed on the basis of the combined weight of a plurality of combinations of article groups, and the combined number of the combined article groups. More specifically, the combined weight of a desired number of combinations of article groups, the number of which agrees with a set number, is divided by their combined number to find unit weights each time a certain number of counting operations are carried out or during a certain length of time. Then, the mean value of such unit weights is computed, and is stored as a new unit weight when it falls within a preset range. The stored unit weight is employed in the next and succeeding counting operations until a certain number of counting operations are effected or until a certain length of time elapses, for computing the number of articles based on the weights thereof as measured by the weighing hoppers 1-1, . . . 1-n.

Furthermore, the present invention establishes upper and lower limits for the number of the articles, all of combinations of which are computed and stored, and all or desired ones of those combinations that contain a number of articles which agrees with a set number, are stored, and all or desired ones of combined numbers of articles are stored by searching for combinations between upper and lower number limits. The combined weight of each of the stored combinations is computed, stored and divided by its combined weight to determine unit weights. The mean value of the determined unit weights is computed, and stored as a new unit weight when it is within a preset range.

According to the present invention, furthermore, all of the combinations computed and the combined numbers thereof may be stored and all of the combined weights may be computed and stored each time a certain number of counting operations are effected or during a certain interval of time. All of the stored combined weights may be divided by the combined numbers to find unit weights which are averaged. The mean value may be stored directly as a new unit weight, or may be stored as a new unit weight only when it falls within a preset range.

Although in the foregoing embodiments of the invention unit weights are computed respectively for combined weights, combined weights of all or desired ones of combinations containing articles the numbers of which fall between upper and lower number limits may be added to find a total weight, and the combined numbers may be added to find a total number each time a certain number of counting operations are effected or during a certain period of time. The computed total weight may then be divided by the total number to determine a unit weight, which may be stored directly as a new unit weight or may be stored only when it is within a preset range.

Still another modification of the present invention will be described. While in the foregoing embodiments a new unit weight is derived from one or more combined weights, articles charged in a single weighing hopper may be weighed and the weight may be divided by the number of the articles in the weighing hopper to derive a new unit weight each time a certain number of counting operations are carried out or during a certain length of time.

The unit weight may be renewed only when a computed new unit weight, falls within a preset range. The new unit weight as stored, may be used to derive the number of articles from the weight thereof in each of the weighing hoppers in a next combinatorial counting operation. Where the single weighing hopper is fixedly determined, the unit weight is not renewed when the articles are not discharged from this weighing hopper. Therefore, it is necessary that the articles charged in a different weighing hopper be weighed in each combinatorial counting operation, and that the weight be divided by the number of the articles contained in the weighing hopper to find a new unit weight. Alternatively, the weights of batches of articles contained in all or desired ones of n weighing hoppers may be divided by the numbers of the articles in the weighing hoppers to determine unit weights, and the mean value thereof may be used as a new unit weight each time a certain number of counting operations are performed or during a certain interval of time. Furthermore, the weights of articles charged in all or desired ones of n weighing hoppers may be added together to find a total weight, and the numbers of articles in the weighing hoppers may be added to determine a total number of articles, so that the total weight can be divided by the total number to derive a new unit weight.

While in the foregoing embodiments a combination is obtained which has the number of combined articles equal to a set number, a combination containing the number of combined articles which is closest to a set number may be sought. With such an arrangement, the number of combined articles which is closest to the set number may not be equal to the set number, and the combined weight is divided by such a closest number to find a new unit weight. In addition, any one of combinations, such as the combination which has first been located as having the number of articles equal to the set number may be selected out of those combinations which have the numbers of combined articles equal or closest to the set number, so that the articles can be discharged on the basis of the selected combination. This procedure does not require use of the upper weight limit setting unit, the lower weight limit setting unit, and the weight setting unit. As another alternative, only one of the combinations which has the number of combined articles selected out of numbers of combined articles computed in the previous combination computing operation and equal or closest to the set number may be stored at all times during combination computing procedure, and when all of the combination computing operations have been completed, the combination which has the number of combined articles equal or closest to the set number may be selected out of all of the combinations available. While in the previous embodiments the n numbers are determined by converting the n weights measured by the n weighing hoppers, a single weighing hopper may be used to weigh a plurality of batches of articles in a single combinatorial counting operation. With this arrangement, the n weights may be determined by using a single weighing hopper or a plurality of weighing hoppers, and the n numbers may be found by converting the determined weights into the numbers.

Although certain preferred embodiments have been shown and described in detail, it should be understood that many changes and modifications may be made therein without departing from the scope of the appended claims.

What we claim is:

1. A method of counting articles, comprising the steps of:
   (a) weighing articles contained in a plurality of hoppers to determine their weights;
   (b) converting the weights into the numbers of articles contained in the hoppers by dividing each of the weights by a preset unit weight for the articles;
   (c) computing the converted numbers of articles contained in the hoppers in combinations to derive the number of articles in each of the combinations;
   (d) comparing the computed number of articles in each of the combinations with a preset request number to find a combination for which the number of articles is equal to or closest to the preset request number within a preset allowable range;
   (e) generating a discharge signal to select hoppers out of the plurality of hoppers, in dependence upon the combination found in said step (d), to discharge the articles from the selected hoppers;
   (f) deriving a new unit weight from at least one of the weights determined in said step (b) and the corresponding at least one of the numbers converted therefrom in said step (b) each time a predetermined number of counting operations, including said steps (a) through (e), are effected or after a predetermined length of time has elapsed; and
   (g) renewing the preset unit weight with the new unit weight.

2. A method according to claim 1, further comprising the step of ascertaining whether the new unit weight falls within a preset weight range subsequently to said deriving step (f), the preset unit weight being renewed into the new unit weight in said step (g) only when the new unit weight falls within the preset weight range.

3. A method according to claim 2, wherein said converting step (b) includes the step of storing the converted numbers of articles.

4. A method according to claim 3, wherein said computing step (c) comprises the steps of:
   reading the numbers of articles in those hoppers which correspond to a combination code representing each of the combinations; and
   adding the numbers as read to derive the number of articles in each of the combinations.

5. A method according to claim 4, wherein said computing step (c) further includes the step of storing the combination codes and the numbers of combined articles corresponding to the combination codes, respectively.

6. A method according to claim 5, wherein said step (e) includes delivering selected ones of the combination codes as the discharge signal.

7. A method according to claim 2, wherein said deriving step (f) includes the steps of:
   comparing the count in a counter for counting the number of counting operations with a set number of counting operations; and
   deriving the new unit weight when the result of the comparison corresponds to a predetermined result.

8. A method according to claim 2, wherein said deriving step (f) includes the steps of:
   counting the predetermined length of time; and
   deriving the new unit weight based on the counting of the predetermined length of time.

9. A method according to claim 2, wherein said deriving step (f) includes deriving the new unit weight from the weight corresponding to the combination found in said step (d) and the number corresponding thereto.

10. A method according to claim 2, further comprising the step of ascertaining whether the total weight based on the combination found in said step (d) falls within a preset total weight range subsequently to said comparing step (d).

11. A method according to claim 1, wherein said converting step (b) includes the step of storing the converted numbers of articles.

12. A method according to claim 11, wherein said computing step (c) comprises the steps of:
   reading the numbers of articles in those hoppers which correspond to a combination code representing each of the combinations; and
   adding the numbers as read to derive the number of articles in each of the combinations.

13. A method according to claim 12, wherein said computing step (c) further includes the step of storing the combination codes and the numbers of combined articles corresponding to the combination codes, respectively.

14. A method according to claim 13, wherein said step (e) includes delivering selected ones of the combination codes as the discharge signal.

15. A method according to claim 1, wherein said deriving step (f) includes the steps of:
   comparing the count in a counter for counting the number of counting operations with a set number of counting operations; and
   deriving the new unit weight when the result of the comparison corresponds to a predetermined result.

16. A method according to claim 1, wherein said deriving step (f) includes the steps of:
   counting the predetermined length of time; and
   deriving the new unit weight based on the counting of the predetermined length of time.

17. A method according to claim 1, wherein said deriving step (f) includes deriving the new unit weight from the weight corresponding to the combination found in said step (d) and the number corresponding thereto.

18. A method according to claim 1, further comprising the step of ascertaining whether the total weight based on the combination found in said step (d) falls within a preset total weight range subsequently to said comparing step (d).

19. A method of counting articles, comprising the steps of:
(a) weighing articles contained in a plurality of hoppers to determine their weights;
(b) converting the weights into the numbers of articles contained in the hoppers by dividing each of the weights by a preset unit weight for the articles;
(c) computing the converted numbers of articles contained in the hoppers in combinations to derive the number of articles in each of the combinations;
(d) comparing the computed number of articles in each of the combinations with a preset request number to find one of the combinations which has a number of articles equal to or closest to the preset request number;
(e) generating a discharge signal to select hoppers out of the plurality of hoppers in dependence upon the one of the combinations, to discharge the articles from the selected hoppers;
(f) deriving a new unit weight from at least one of the weights determined in said step (b) and the corresponding at least one of the numbers converted therefrom in said step (b) each time a predetermined number of counting operations, including said steps (a) through (e), are affected or after a predetermined length of time has elapsed;
(g) ascertaining whether the new unit weight falls within a preset weight range subsequently to said deriving step (f); and
(h) renewing the preset unit weight with the new unit weight only when the new unit weight falls within the preset weight range.

20. A method according to claim 19, wherein said converting step (b) includes the step of storing the converted numbers of articles.

21. A method according to claim 20, wherein said computing step (c) comprises the steps of:
reading the numbers of articles in those hoppers which correspond to a combination code representing each of the combinations; and
adding the numbers as read to derive the number of articles in each of the combinations.

22. A method according to claim 21, wherein said computing step (c) includes the step of storing the combination codes and the numbers of combined articles corresponding to the combination codes, respectively.

23. A method according to claim 22, wherein said step (e) includes delivering selected ones of the combination codes as the discharge signal.

24. A method according to claim 19, wherein said deriving step (f) includes the steps of:
comparing the count in a counter for counting the number of counting operations with a set number of counting operations; and
deriving the new unit weight when the result of the comparison corresponds to a predetermined result.

25. A method according to claim 19, wherein said deriving step (f) includes the steps of:
counting the predetermined length of time; and
deriving the new unit weight based on the counting of the predetermined length of time.

26. A method according to claim 19, wherein said deriving step (f) includes deriving the new unit weight from the weight corresponding to the combination found in said step (d) and the number corresponding thereto.

27. A method according to claim 19, further comprising the step of ascertaining whether the total weight based on the combination found in said step (d) falls within a preset total weight range subsequently to said comparing step (d).

28. A method of counting articles arranged in batches, comprising the steps of:
(a) weighing each batch of articles to determine a batch weight for each of the batches;
(b) determining batch numbers, corresponding to the number of articles in each batch, based on the batch weights determined in said step (a) and a unit weight for the articles;
(c) computing combined numbers by adding different combinations of the batch numbers;
(d) finding at least one optimum combination of batches for which the combined number is equal to or closest to a preset request number, within a predetermined range; and
(e) selectively updating the unit weight employed in said step (b) based on the combined number and the total weight of the at least one optimum combination of batches determined in said step (d).

29. A method according to claim 28, wherein said selective updating step (b) comprises selectively updating the unit weight each time a predetermined number of counting operations, including said steps (a) through (d), have been affected.

30. A method according to claim 29, wherein said selective updating step comprises the steps of:
computing a new unit weight based on the combined number and the total weight of one of the least one optimum combination of batches found in said step (d); and
updating the unit weight with the new unit weight only when the new unit weight falls within a preset weight range.

31. A method according to claim 28, wherein said selective updating step (e) comprises selectively updating the unit weight each time a predetermined length of time elapses.

32. A method according to claim 31, wherein said selective updating step comprises the steps of:
computing a new unit weight based on the combined number and the total weight of one of the least one optimum combination of batches found in said step (d); and
updating the unit weight with the new unit weight only when the new unit weight falls within a preset weight range.

33. A method according to claim 28, wherein said selective updating step comprises the steps of:
computing a new unit weight based on the combined number and the total weight of one of the least one optimum combination of batches found in said step (d); and
updating the unit weight with the new unit weight only when the new unit weight falls within a preset weight range.

* * * * *

UNITED STATES PATENT AND TRADEMARK OFFICE
CERTIFICATE OF CORRECTION

PATENT NO. : 4,566,070

DATED : JANUARY 21, 1986

INVENTOR(S) : KUNIFUSA TANAKA

Page 1 of 2

It is certified that error appears in the above-identified patent and that said Letters Patent is hereby corrected as shown below:

Col. 8, line 40, "pakaging" should be --packaging--.

Col. 9, line 59, "a" (first occurrence) should be --$a$--; and "$a$" (second occurrence) should be --a--.

Col. 12, line 6, "setting," (first occurrence) should be --setting--; and line 6, "setting" (second occurrence) should be --setting,--;

line 8, "setting," (first occurrence) should be --setting--; and line 8, "setting" (second occurrence) should be --setting,--;

line 12, "setting," (first occurrence) should be --setting--; and line 12, "setting" (second occurrence) should be --setting,--;

line 18, "pakaging" should be --packaging--.

Col. 13, line 41, "applying" should be --applying,--.

Col. 14, line 63, "$f$" should be --$d$--.

UNITED STATES PATENT AND TRADEMARK OFFICE
CERTIFICATE OF CORRECTION

PATENT NO. : 4,566,070

DATED : JANUARY 21, 1986

INVENTOR(S) : KUNIFUSA TANAKA

It is certified that error appears in the above-identified patent and that said Letters Patent is hereby corrected as shown below:

```
Col. 16, line 47, "setting," (first occurrence) should be
                  --setting--; and
         line 47, "setting" (second occurrence) should be
                  --setting,--;
         line 49, "setting," (first occurrence) should be
                  --setting--; and
         line 49, "setting" (second occurrence) should be
                  --setting,--;
         line 51, "setting," should be --setting--;
         line 52, "setting" should be --setting,--;
         line 54, "setting," should be --setting--;
         line 55, "setting" should be --setting,--.

Col. 18, line 31, "weight," should be --weight--;
         line 64, after "of" insert --the--.

Col. 22, line 32, "(b)" should be --(e)--.
```

Signed and Sealed this

Sixth Day of May 1986

[SEAL]

Attest:

DONALD J. QUIGG

Attesting Officer

Commissioner of Patents and Trademarks